US007914199B2

(12) United States Patent
Kateman et al.

(10) Patent No.: US 7,914,199 B2
(45) Date of Patent: Mar. 29, 2011

(54) APPARATUS AND METHODS FOR FABRICATING A FROZEN FOOD PRODUCT

(75) Inventors: Paul R. Kateman, Wellesley, MA (US); Richard Rosenberger, Hopedale, MA (US)

(73) Assignee: MooBella, Inc., Taunton, MA (US)

( * ) Notice: Subject to any disclaimer, the term of this patent is extended or adjusted under 35 U.S.C. 154(b) by 404 days.

(21) Appl. No.: 12/154,080

(22) Filed: May 19, 2008
(Under 37 CFR 1.47)

(65) Prior Publication Data

US 2009/0117242 A1     May 7, 2009

Related U.S. Application Data

(60) Provisional application No. 60/939,225, filed on May 21, 2007.

(51) Int. Cl.
*B01F 15/04* (2006.01)
*B01F 15/06* (2006.01)
*A23G 9/20* (2006.01)
*A23G 9/28* (2006.01)

(52) U.S. Cl. .................. 366/144; 366/162.1; 366/163.2; 366/182.2; 366/182.4; 62/258; 62/458

(58) Field of Classification Search .................. 366/101, 366/106–107, 162.1, 163.1, 163.2, 189, 191, 366/144–149; 99/494; 426/519; 62/258, 62/458

See application file for complete search history.

(56) References Cited

U.S. PATENT DOCUMENTS

| 2,686,404 | A | * | 8/1954 | Kurtz .............................. 62/458 |
| RE28,924 | E | | 8/1976 | Neumann et al. ............... 62/320 |
| 3,976,087 | A | * | 8/1976 | Bolton et al. .............. 137/15.01 |
| 5,473,909 | A | * | 12/1995 | Kateman et al. ................ 62/306 |
| 5,700,494 | A | * | 12/1997 | Masse et al. ............... 425/131.1 |
| 5,727,713 | A | * | 3/1998 | Kateman et al. .......... 222/145.6 |
| 5,758,571 | A | * | 6/1998 | Kateman et al. ................ 99/455 |
| 5,962,035 | A | * | 10/1999 | Masse et al. ............... 425/131.1 |
| 6,745,595 | B1 | * | 6/2004 | Kateman et al. ................ 62/458 |
| 6,941,858 | B2 | * | 9/2005 | Kateman ........................ 99/455 |

(Continued)

FOREIGN PATENT DOCUMENTS

DE          1 946 568        4/1971

*Primary Examiner* — Charles E Cooley
(74) *Attorney, Agent, or Firm* — Cesari and McKenna, LLP

(57) ABSTRACT

An apparatus for a frozen food product, such as an ice cream or frozen-yoghurt product, produces an aerated and flavored base mix. The base mix is provided in a liquid form to the apparatus and is mixed with a gas in the apparatus to aerate the base mix. Flavor is added to the aerated base mix in a turbulence tube of the apparatus, and the aerated and flavored base mix is then deposited out of the turbulence tube onto a cold plate of the apparatus as a thin layer material. The cold plate may be disposed such that it is in open view of a customer. One or more solid-food mix-in additives can be added to the aerated and flavored base mix on the cold plate. The aerated and flavored base mix is allowed to at least partially freeze on the cold plate with the additive(s) dispersed therein to produce a frozen food product, which is then manually scraped from the cold plate and served to a customer. The apparatus for fabricating the frozen food product (with the assistance of a human operator) can define a small footprint and can be designed as a portable cart or a mobile or stationary counter. A method of making a frozen food product with the apparatus is provided.

25 Claims, 9 Drawing Sheets

U.S. PATENT DOCUMENTS

| | | | |
|---|---|---|---|
| 7,318,324 B2 * | 1/2008 | Ulrich et al. | 62/342 |
| 7,537,375 B2 * | 5/2009 | Hoff et al. | 366/141 |
| 2003/0085237 A1 | 5/2003 | Kateman et al. | 222/1 |
| 2005/0024988 A1 * | 2/2005 | Hoff et al. | 366/141 |
| 2006/0003065 A1 * | 1/2006 | Kateman | 426/506 |
| 2006/0054614 A1 | 3/2006 | Baxter et al. | 219/400 |
| 2007/0140043 A1 * | 6/2007 | Jones et al. | 366/144 |
| 2007/0140044 A1 * | 6/2007 | Jones et al. | 366/144 |
| 2009/0117242 A1 * | 5/2009 | Kateman et al. | 426/474 |
| 2009/0120306 A1 * | 5/2009 | DeCarlo et al. | 99/485 |

* cited by examiner

APPARATUS AND METHODS FOR FABRICATING A FROZEN FOOD PRODUCT

PRIOR PATENT APPLICATION

This patent application is a nonprovisional patent application of U.S. provisional patent application Ser. No. 60/939,225 filed May 21, 2007, the disclosure of which is incorporated herein by reference in its entirety.

BACKGROUND

Machines for fully automated fabrication of food products are known; however, the customer experience with such machines is often limited as the transaction will generally be impersonal and the customer will have limited opportunity to observe the fabrication process. Accordingly, many customers will prefer to observe steps in preparing the food product.

Production of ice-cream products with mixed-in ingredients, such as nuts, candy, and fruit, per the consumer's selection has gained in both popularity and availability in the United States. Per the conventional in-store, manual method, a finished, frozen ice cream product is provided in storage; and the desired mixed-in ingredients are manually worked into the ice cream on a cold surface via a manual kneading operation. A customer to the store can thereby obtain an ice-cream product with the extra mixed-in ingredients that they desire and can observe the mixing of ingredients into the ice cream.

SUMMARY

The invention provides apparatuses and methods for fabricating a frozen food product, such as an ice cream or frozen-yoghurt product, from an un-aerated and un-flavored base mix. The base mix is provided in a liquid form and is mixed with a gas, e.g., air, to aerate the liquid base mix. Flavor is added to the liquid base mix in a turbulence tube that defines a passage, e.g., having a generally circular cross section; the aerated and flavored base mix is provided from, e.g., sprayed out of or exiting from, the turbulence tube directly or indirectly onto a cold plate in view of the customer. A solid food additive can be added to the aerated and flavored base mix on the cold plate, e.g., also under the observation of a customer. The aerated and flavored base mix form a thin layer on the cold plate and is allowed to at least partially freeze on the cold plate with the solid food additive dispersed therein to produce a frozen food product, which is manually scraped from the cold plate and served to a customer.

The cold plate includes a cooling mechanism, including a eutectic cooling composition that can maintain a consistent low temperature, even when confronted with a sudden thermal load when the comparatively warm base mix is deposited thereon. One or more base-mix containers are provided, each containing a liquid base mix. For example, one base mix in a first container can be formulated for premium ice cream, and another base mix in a second container can be formulated for light ice cream (i.e., including a lower fat and lower sugar composition). In another embodiment, the second (or third) base mix can be a yoghurt composition for producing frozen yoghurt. Each base-mix container is coupled with a respective base-mix conduit, which is operatively coupled with a peristaltic pump designed to draw base mix from the container and to facilitate flow of base mix into the base-mix conduit. Respective base-mix conduits extending from the respective base-mix containers are joined with a first gas conduit for aeration of base mix. The first gas conduit is coupled with a pressurized-gas source. Accordingly, gas from the first gas conduit can be injected into a selected base mix flowing from the base-mix conduit, thereby aerating the base mix.

In one apparatus of this disclosure, the cold plate includes a ceramic coating along its exposed surface, including, for instance, a ceramic coating available from General Magnaplate of Linden, N.J.

In an apparatus of this disclosure, different flavors are provided, respectively, in a plurality of flavor containers. Each flavor container is coupled with a dedicated-flavor conduit, which is operatively coupled with a peristaltic pump designed to draw flavor from the container and to facilitate flow of flavor into the dedicated-flavor conduit. At its end opposite to the flavor container, each dedicated-flavor conduit is coupled with a flavor block. The peristaltic pump will draw and pump a selected flavor from its container and through its associated dedicated-flavor conduit to the flavor block. Flow of the flavor through the flavor block can be facilitated by a light flow of gas from a second gas conduit into the flavor block. More specifically, introduction of the light gas flow pushes the flavor through the flavor block at a faster rate, enabling better mixing of the flavor and base mix downstream in the turbulence tube. A common flavor conduit, through which each selected flavor flows, provides a passage for the flavor to flow from the flavor block to the turbulence tube where the flavor is mixed with the aerated base mix. The turbulence tube includes restrictive bodies within its interior configured to increase the turbulence of fluids passing there through and thereby improves mixing of fluids within the turbulence tube.

In another embodiment of the apparatus, flavor containers matching the above description are replaced with other liquid-ingredient containers containing, e.g., a nutritional or energy supplement, such as ascorbic acid (vitamin C), protein isolate, spirulina, echinacea, guarana, ginseng, ginkgo biloba, creatine, or caffeine, provided in a liquid or liquid-based, e.g., liquid-dispersed, form. These liquid ingredients can likewise be selected by a customer and delivered from the containers through the flavor block to the turbulence tube where they are mixed with the aerated base mix, as described above.

Selectors, e.g., dials, actuators and/or switches, are provided on the apparatus and are operable by the operator to select the requested base mix and flavor. The selectors are electronically coupled with a programmable logic controller, which is coupled with the pumps provided for the base mixes and the flavors. When a selector is actuated, a current path will be closed to transmit electronic signal(s) to the programmable logic controller. The programmable logic controller, in accordance with the received signal(s), then sends start command (s) to a pump for the selected ingredient.

The apparatuses and methods provide substantial advantages over existing systems and methods because they utilize a liquid base mix. The base mix can be a mix for producing a variety of food products, such as ice cream, frozen yoghurt, gelato, frozen custard, etc. The liquid base mix occupies substantially less volume than does an aerated frozen food product.

Moreover, the liquid base mix, which is held at temperatures ranging between about 35° F. and about 40° F., in an apparatus of this disclosure requires substantially less refrigeration than does a frozen base product. The liquid base mix is aseptic in its container; accordingly, it can be maintained in an un-refrigerated state, e.g., at ambient or room temperature, until it is punctured or otherwise opened and coupled with the apparatus for use in production of a food product.

A plurality of liquid base mixes can be supplied in an apparatus of this disclosure, where a selected liquid base mix is mixed with a desired flavoring and aerated before being dispensed onto a cold plate. Selected solid-food mix-in ingredients, e.g., nuts, candies, fruits, and portions thereof, can then be added to the aerated, flavored liquid base mix on the cold plate. The cold plate at least partially freezes the liquid base mix to form a frozen food product in which the flavoring and mixed-in ingredient(s) are dispersed. Accordingly, the frozen food product can be made fresh, on-demand from basic ingredients, including the liquid base mix, per customer specifications.

The apparatus can take the form of a compact portable food cart or counter. The food cart or counter can be stationed, e.g., in cafeterias, or located in heavily trafficked pedestrian travel ways, e.g., urban sidewalks, shopping malls, airports, etc., defining a relatively small footprint of operation. Alternatively, the apparatus can take the form of an integrated unit that can be incorporated with or serve as a permanently installed service counter.

Figure 1:
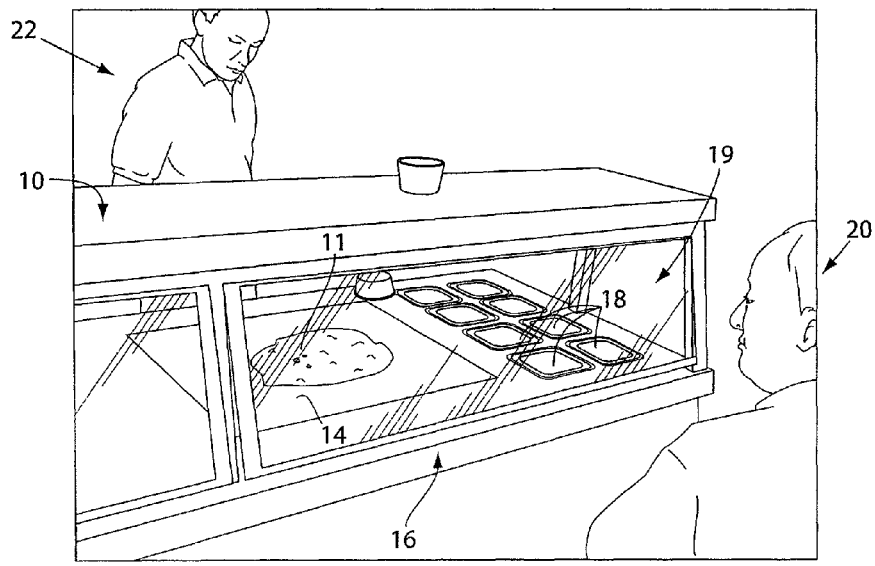
FIG. 1 shows an apparatus being used by an operator to prepare a frozen food product for a customer.

The foregoing and other features and advantages of the invention will be apparent from the following, more-particular description. In the accompanying drawings, like reference characters refer to the same or similar parts throughout the different views. The drawings are not necessarily to scale, emphasis instead being placed upon illustrating particular principles, discussed below.

DETAILED DESCRIPTION

Referring to FIGS. 1-4, a frozen food product 12, e.g., in a single-serving size, can be manually produced via an apparatus 10 including a cold plate 14 incorporated into a compact workstation 16, e.g., in the form of a cart or a counter. The workstation 16 can define a relatively small footprint, e.g., having a footprint of about 30 square feet or 3 feet by 10 feet, and can be provided with wheels along its base, e.g., at the base of its legs, in order the workstation 16 may be portable and mobile for location at a number of sites to serve customers.

Figure 3:
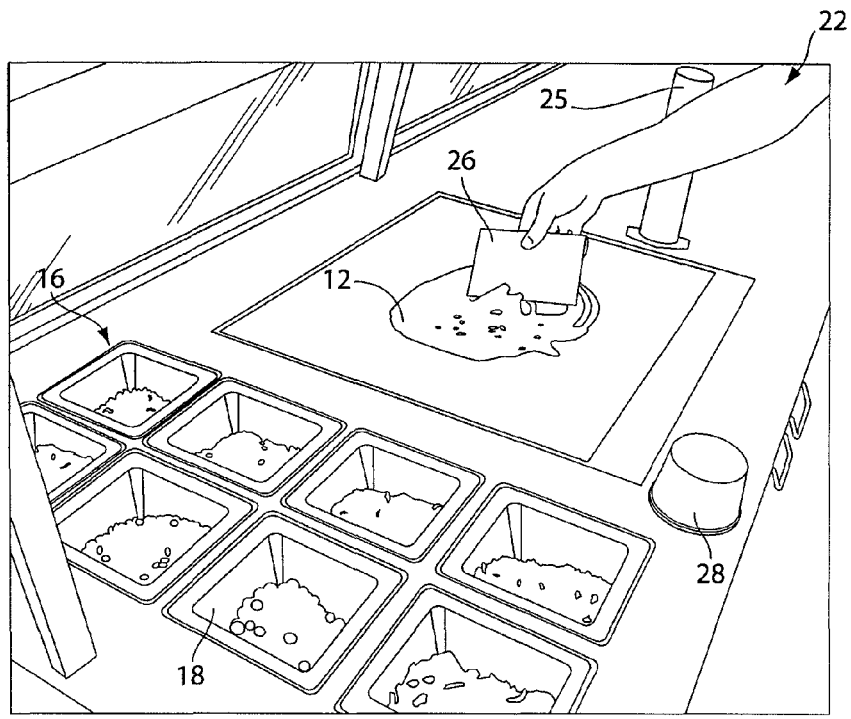
FIG. 3 shows the operator using a spatula to manipulate the product on the cold plate.

In one embodiment, a human operator 22 deposits an aerated, flavored liquid base mix 11 either directly onto the cold plate 14 or into an intermediate container 25 and then pours the base mix 11 from the intermediate container 25 onto the cold plate 14. Use of the intermediate container 25 limits splattering of the flavored base mix 11 off the cold plate 14. The cold plate 14 is not enclosed and is directly accessible to the operator 22 so that the operator 22 can extend his or her hand over the cold plate 14 to deposit base mix or mix-in additives onto the cold plate 14 during operation. In addition, the cold plate 14 may be incorporated with the apparatus 10, such that the cold plate 14 is fully visible to the operator 22 and a customer 20, as shown in FIGS. 1 and 3.

The aerated, flavored base mix 11 comprises a liquid base mix, e.g., including milk, butterfat, sugar, etc., one or more flavors, e.g., vanilla, chocolate, strawberry, etc., and gas dispersed there through. The cold plate 14 rapidly freezes the aerated, flavored base mix 11 or portions thereof to form a frozen food product 12. As used to disclose the invention, a "frozen" food product refers to a food product that is at least partially frozen.

Figure 2:
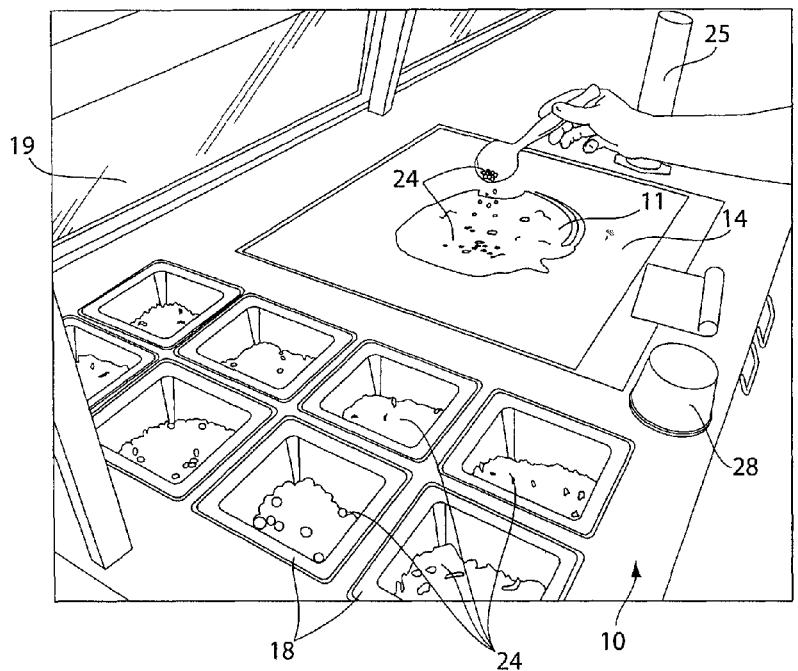
FIG. 2 shows the addition of mix-in additives to a freezing food product on a cold plate of the apparatus of FIG. 1.

One or more solid food mix-in additives 24, e.g., fruits, nuts, candies and portions thereof, may be dispersed in the frozen food product 12 while the food product 12 is being formed on the cold plate 14. As shown in FIG. 2, in one embodiment, an operator 22 may manually scoop from any of a plurality of containers 18 one or more mix-in additives 24 and pour additives 24 onto the aerated and flavored base mix 13 as it is freezing on the cold plate 14. Each container 18 contains a distinct mix-in additive 24. Optionally, the operator 22 can manually spread the aerated and flavored base mix 11 across the cold plate 14, e.g., using a spatula 26. The base mix 11, the flavoring and the mix-in additives 24 all are selected by the customer 20, who communicates his/her preferences to the operator 22 when placing his/her order. The customer 20 can then watch the fabrication of the frozen food product 12, e.g., through a transparent glass window 19 associated or incorporated with the apparatus 10.

In other embodiments, the stages of fabricating a frozen food product 12 described herein are mechanized, e.g., performed by automated machinery, instead of by a human operator 22. For example, one or more robotic arms can be provided to dispense the base mix 11 and/or the mix-in additives 24 onto the cold plate 14 and to scrape the frozen food product 12 from the cold plate 14. In additional embodiments, both a turbulence tube, as described in detail below, and the plurality of containers 18 for the mix-in additives 24 are mounted above the cold plate 14. In this case, the containers 18 for the mix-in additives 24 can be mounted, for example, over a rotating plate with an orifice that will dispense the mix-in additive 24 into a container when the orifice is aligned there under.

Figure 4:
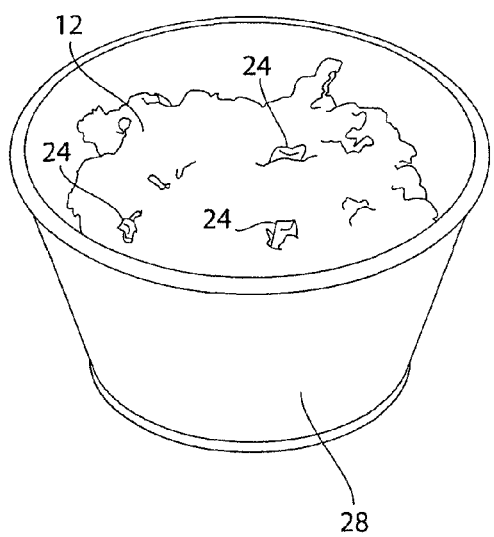
FIG. 4 shows a frozen food product with mixed-in additives in a cup.

As shown in FIG. 3, after the additives 24 are mixed in and the base mix is frozen or at least partially frozen to produce the frozen food product 12, in the human-operated embodiment, the operator 22 scrapes the frozen food product 12 from the cold plate 14 with a spatula 26. As the frozen food product 12 is scraped up, the operator 22 deposits the frozen food product 12 into a cup 28, e.g., a disposable paper cup, as shown in FIG. 4, or into a cone, e.g., a plain, sugar or waffle cone commonly used for serving ice cream, yoghurt, etc. The frozen food product 12 can be shaped, e.g., rounded or compacted, as the operator 22 packs the product 12 into the cup 28. After a quick purging operation, as described in detail below, the operator 22 and the apparatus 10 are ready to produce another frozen food product 12, in response to receiving an order from another customer, repeating the process described above using the apparatus 10 with the same or different selections of the base mix 11, flavors, mix-in additives 24, and/or any other possible ingredients, e.g., nutrition supplements.

Figure 5:
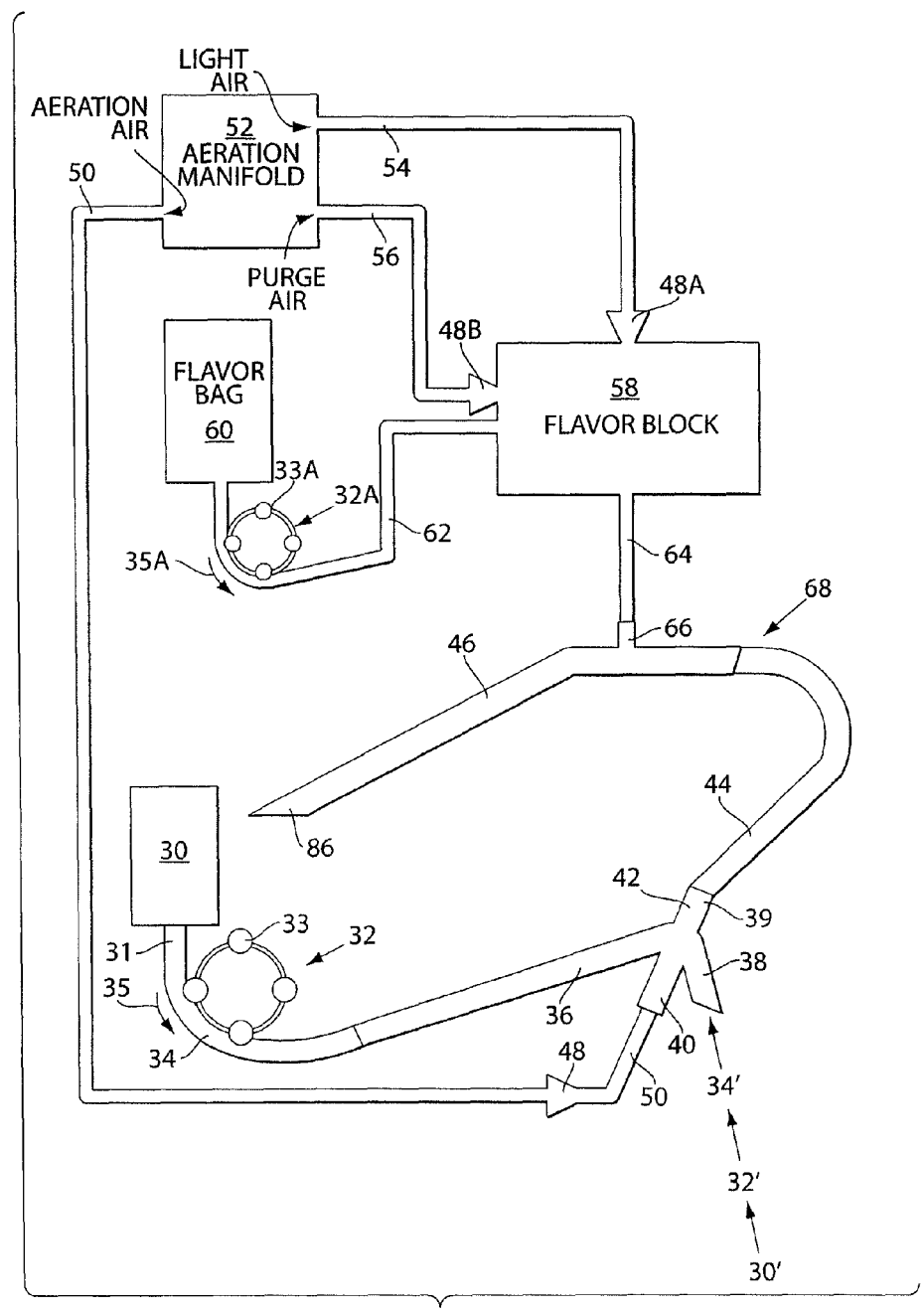
FIG. 5 is a schematic illustration showing various components of the apparatus of FIG. 1 for producing the frozen food product.

Referring to FIG. 5, a schematic illustration of portions of the apparatus 10 for aerating and adding flavors to the base mix 11 and depositing the aerated and flavored base mix 11 onto a cold plate 14 are shown. A liquid base mix is stored in a container 30, e.g., in the form of an otherwise-sealed plastic bag, with an outlet port 31 to which a base-mix conduit 34, e.g., in the form of food-grade flexible tubing, is coupled. (Where references are made in the disclosure and claiming of the invention to components, such as conduits, being coupled or joined with other components, such as ports, the coupled components can be in the form of two discrete components or as parts of a unitary structure). The base mix is drained from the container 30 through the outlet port 31 using a peristaltic pump 32, which comprises a plurality of shoes or rollers 33 about its perimeter such that, when the pump 32 is rotated, the shoes 33 drive the base mix into and through the flexible tubing conduit 34. The shoes 33 of the peristaltic pump 32 rotate in a counterclockwise direction, as shown by arrow 35 in FIG. 5, to compress a portion of the flexible tubing conduit 34 with which the shoes 33 are in contact at any given moment to thereby push the base mix via positive displacement into a first base-mix input 36, while generating a vacuum upstream of the pump 32, which draws out more of the base mix from container 30 through the outlet port 31. An advantage of using the peristaltic pump 32 is that the pump 32 does not contaminate a fluid, i.e., the base mix, flowing through the conduit 34 and because the fluid, in turn, does not contaminate the pump 32. The flexible tubing conduit 34 couples to the first base-mix input 36. The conduit 34 can have preferably an inner diameter of about ¼ inch. The peristaltic pump 32 achieves a flow rate of preferably about 25 milliliters/minute, while the flow rate is a function of the viscosity of the base mix flowing from the container 30. Many conventional ice cream bases or mixes will work in the apparatus 10.

As shown in FIG. 5, the first base-mix input 36 is one inlet of a fluid junction 42, e.g., a crow's foot fluid junction. The fluid junction 42 is formed, e.g., of metal or plastic, and defines intersecting passages or inlets 36, 38, and 40 and an outlet 39 for fluid flow therein. One or more additional base-mix inputs 38 are likewise included or coupled with the crow's foot fluid junction 42. Each additional input port 38 may be coupled with a conduit 34', e.g., formed of food-grade flexible tubing, as described above, and with a peristaltic pump 32' and a second base mix container 30', as described above, filled with a distinctive base mix. The additional inlet 38, pump 32', conduit 34' and container 30' are configured and arranged as the first set of components 30, 32 and 34 coupled with the first base-mix input port 36. Accordingly, in one embodiment, a first container 30 may supply a "premium" ice-cream base mix through the first base-mix input 36, while a "light" or low-fat version of the base mix may be pumped from a second base-mix container 30' through the second base-mix input 38. The light version of the ice-cream base mix can have a lower fat content, e.g., half as much fat or less than the "premium" mix, and no added sugars beyond those naturally found in the base ingredients, e.g., lactose in the milk, though it may include sugar alcohols, e.g., SPLENDA® or NUTRASWEET® sweetener. Alternatively, or in addition, one or more base mixes for other types of frozen food products, e.g., frozen yoghurt or non-dairy food products such as soy-based products, may be respectively stored in one or more base-mix containers, such as base-mix containers 30 and 30'.

In addition to the base-mix inputs 36 and 38, the crow's foot fluid junction 42 includes an air-input 40. The air-input 40 is coupled with a first gas conduit 50 and a check valve 48 for receiving aeration gas. The check valve 48 is designed to control flow of gas from an air manifold 52 through the air-input 40 for aeration of the base mix. In one embodiment, the air manifold 52 includes an oil-less piston pump, such as, for example, that manufactured by Gast Manufacturing, Inc. of Benton Harbor, Mich., USA. The manifold 52 can be designed to provide preferably to the apparatus 10 gas, e.g., air, at about 40 pounds per square inch, and, more particularly, to the gas conduit 50 and the air-input 40, as well as any of a number of conduits of the apparatus 10, as described in detail below. The check valve 48 also prevents fluids from flowing back toward the air manifold 52 from the crow's-foot fluid junction 42. In one embodiment, aeration air from the air manifold 52 flows through the first gas conduit 50, e.g. at about 70 standard cubic feet per minute, through the check valve 48, and through the air-input 40 into the fluid junction 42 where the aeration air mixes with the base mix from container 30 and/or from one or more other containers 30' coupled with the fluid junction 42.

Each of the base-mix conduit(s) 34 and 34' is coupled with, e.g., operatively connected to, the respective base-mix input 36 and 38. The first gas conduit 50 is coupled with, e.g., operatively connected to, the respect air-input 40. The outlet 39 of the fluid junction 42 couples with, e.g., operatively connected to, a conduit 44, e.g., formed of food-grade flexible tubing. The conduit 44 receives aerated base mix flowing through the fluid junction 42 and the outlet 39. The flexible tubing conduit 44 is a portion of the turbulence tube 68 that couples with a rigid portion 46 of the turbulence tube 68, such that the conduit 44 receives the aerated base mix from the fluid junction 42 and the rigid portion 46 receives the aerated base mix from the conduit 44. The rigid portion 46 of the turbulence tube 68 includes a flavor-input port 66 to which is coupled a common flavor conduit 64, e.g., formed of food-grade flexible tubing, that extends from a flavor block 58. The rigid portion 46 of the turbulence tube may be formed of a hard plastic. The rigid portion 46 of the turbulence tube 68 defines an interior configuration, as described in detail below, that allows the turbulence tube 68 to combine the base mix, gas, e.g., air, and one or more selected flavors to produce the aerated and flavored base mix 11 at an orifice or output 86 of the turbulence tube 68.

The flavor block 58 is coupled with a plurality of dedicated-flavor conduits 62. Each conduit 62, e.g., in the form of food-grade flexible tubing, is coupled with a respective flavor container 60, e.g., in the form of an otherwise-sealed plastic bag, and in contact with a peristaltic pump 32A. The peristaltic pump 32A is configured to draw a selected flavor from the flavor container 60 through the dedicated-flavor conduit 62 and through the flavor block 58. Preferably, the peristaltic pump 32A draws the flavor at a rate of about 25 milliliters per minute. The peristaltic pump 32A operates in a similar manner as the peristaltic pump 32 for the base mix, as described above, and includes a plurality of shoes or rollers 33A that rotate counterclockwise, as shown by arrow 35A in FIG. 5, to compress a portion of the dedicated-flavor conduit 62 with which the shoes 33A are in contact at any given moment. The shoes 33A thereby push the selected flavor via positive displacement into the dedicated-flavor conduit 62, which supplies the selected flavor to the flavor block 58, while generating a vacuum upstream of the pump 32A, which draws out more of the flavor from container 60 into the conduit 62.

From the flavor block 58, the selected flavor flows through the common flavor conduit 64 and then through the flavor-input port 66 into the rigid portion 46 of the turbulence tube 68.

In one embodiment, a plurality of flavor containers 60 are provided, although only a single flavor container 60 is shown in FIG. 5. Each flavor container 60 is coupled with a respective dedicated-flavor conduit 62, which is coupled with a respective flavor-input port 78, as shown and described below with reference to FIG. 10, on the flavor block 58. Each dedicated-flavor conduit 62 is coupled with the respective flavor-input port 78 via a connector. Each of the flavors in the respective containers 60 is a liquid-based solution or dispersion. The different flavors included in the containers 30 can include natural and/or artificial flavors, such as vanilla, chocolate, strawberry, banana, caramel, pistachio, butter pecan, maple, coffee, mango, cake batter, black raspberry, cotton candy, etc.

In another embodiment, one or more of the above-described flavor containers 60 and/or base mix containers 30 and 30' is/are replaced with other liquid-ingredient container(s) containing, e.g., a nutritional or energy supplement, such as ascorbic acid (vitamin C), protein isolate, spirulina, echinacea, guarana, ginseng, ginkgo biloba, creatine, or caffeine, in a liquid or liquid-based, e.g., liquid-dispersed, form. In still another embodiment, one or more other ingredients, e.g., nutritional or energy supplements, is/are added to the flavor block 58 and ultimately to the aerated base mix in the turbulence tube 68 as a powder form in the same or a similar manner as to a method that a dry powder is added to a liquid, e.g., in that case, water, such as that disclosed in co-pending U.S. application Ser. No. 10/884,683, now U.S. Patent Application Publication No. 2006/0003065, entitled "Dry-Base Aerated Food Product Dispensing Method and Apparatus" (Paul Kateman), filed Jul. 1, 2004, which is incorporated herein by reference in its entirety.

The flavor block 58 also includes respective check valves 48A and 48B coupled with a second and a third gas-inlet conduit 54 and 56, respectively, that supply gas from the air manifold 52, e.g., to supply a light gas flow, as described below, and to purge the flavor block 58 and the apparatus 10. In one embodiment, gas supplied through one or more gas-inlet conduits 50, 54 and 56 from the air manifold 52 is air. The second gas conduit 54 is designed to provide light flow of gas, e.g., at about 10 cubic feet per minute, to the flavor block 58. The light flow of gas is mixed in a low volume with the flavor(s) disposed in the flavor block 58 to help to push the flavor(s) through the flavor block 58. Internal passages defined within the flavor block 58 that couple and extend from the check valves 48A and 48B, and that couple and extend from the flavor-input ports 78, form a junction inside the flavor block 52 that is configured to permit intermixing of gas, e.g., light flow of gas or air, with the one or more flavors flowing there through. Each of the second and third gas-inlet conduits 54 and 56 is coupled with, e.g., operatively connected to, the flavor block 58.

Figure 6A:
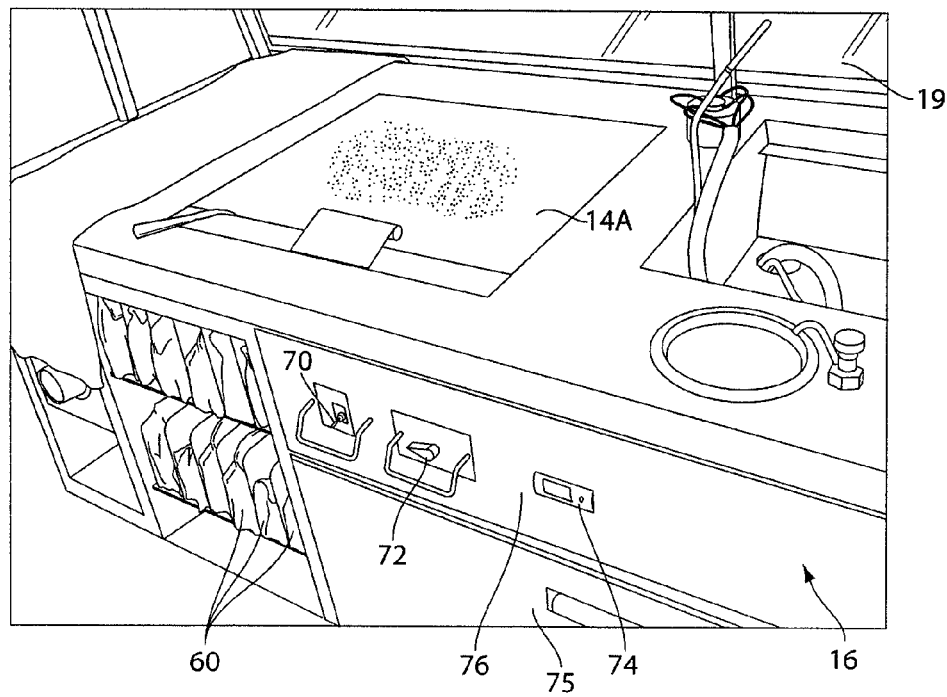
FIG. 6A -shows the apparatus from another perspective.

Referring to FIG. 6A, an operator side of the workstation 16 is shown with the cold plate 14 in view. The cold plate 14 includes an exposed freeze surface 14A (as shown for illustrative purposes having frost formed thereon indicating the cold plate 14 is activated). The cold plate 14 includes one or more cavities 15 that may be filled with a eutectic composition 17 suitable for rapid cooling of the cold plate 14 and/or the exposed freeze surface 14A. The eutectic composition 17 includes any eutectic composition that melts at a temperature below the freezing temperature of the base mix and/or the aerated and flavored base mix 11. For instance, the eutectic composition 17 can have a melting point of about 0° F. and can be in the form of a glycol-based solution. Alternatively, the eutectic composition 17 can be a saline solution or any composition with the desired melting point. The cold plate 14 also includes tubing 201, e.g., copper tubing, for containing and circulating cooled refrigerant, such as FREON or HFC-404A refrigerant. The copper tubing 201 traverses through the cavities 15 in which the eutectic composition 17 is contained to re-freeze the liquid phase of the eutectic composition 17 or to maintain the eutectic composition 17 in a solid state. A suitable cold plate 14 is constructed of 18-gauge stainless steel, such as that available from Delfield Company of Mount Pleasant, Mich., available under the LiquiTec® trademark.

In one embodiment of the invention, the cold plate 14 further includes a ceramic coating along the freeze surface 14A, such as, for instance, a ceramic coating available from General Magnaplate of Linden, N.J.

Figure 6B:
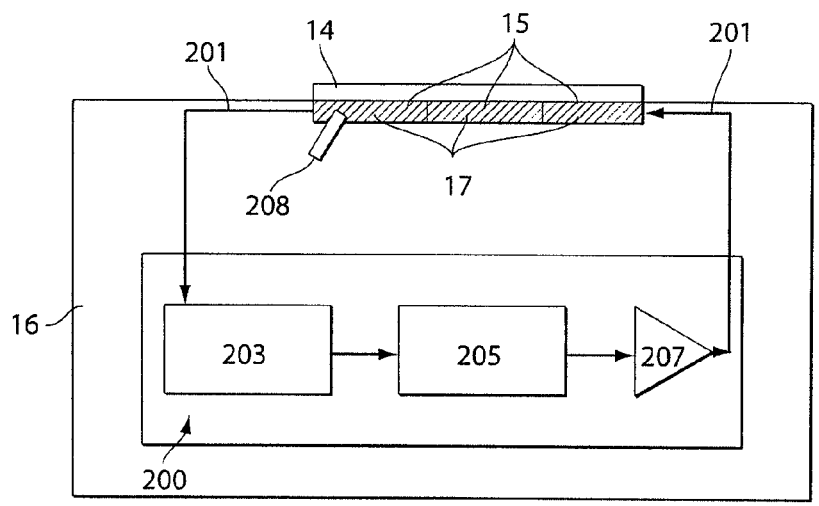
FIG. 6B shows a schematic illustration of a vapor-compression refrigeration system.

Referring to FIG. 6B, and with further reference to FIG. 6A, a schematic illustration of a vapor-compression refrigeration system 200 for cooling the refrigerant contained and circulating in the copper tubing 201 is shown. The system 200 is contained within the workstation 16, e.g., underneath the cold plate 14 and is connected via the copper tubing 201. The copper tubing 201 leaving the cold plate 14 is coupled with a compressor 203 that compresses refrigerant gas as it leaves the cold plate 14. The compressed refrigerant gas is then directed into a condenser 205 in which heat is transferred from the gas, e.g., to ambient air; and liquefies as it cools. After liquefying, the refrigerant is passed through an expansion valve 207, with a consequent pressure drop, thereby further cooling the refrigerant. The cooled refrigerant is then passed through the copper tubing 201 within the cold plate 14 whereby the cooled refrigerant extracts heat from the eutectic composition 17 to re-freeze the eutectic composition and vaporizes to refrigerant gas.

The cold plate 14 has a temperature that is higher than that of the eutectic composition, but sufficiently cold to freeze quickly the base mix and/or the aerated and flavored base mix 11 that is deposited on the cold plate 14 for freezing to form a thin layer on the cold plate. The cold plate 14 may have temperatures in a range of from about −15° F. to about +15° F. or, in particular embodiments, in a range of from about −10° F. to +10° F. When applied to the cold plate, at least a portion of the aerated and flavored base mix 11 forms a thin layer that may have a thickness within the range of from about 0.005 inches to about 0.05 inches. Within this range, a thin-layer thickness of about 0.02 inches to 0.05 inches may be obtained with comparatively little difficulty. Where the aerated and flavored base mix 11 is poured or sprayed, e.g., at room temperature, onto the exposed freeze surface 14A of the cold plate 14, or into the intermediate container 25 and then poured onto the exposed freeze surface 14A, the cold plate 14 is subject to a thermal shock that could otherwise raise the temperature of the cold plate 14 and/or the exposed freeze surface 14A. In this case, the eutectic composition 17 contained within the cavities 15 of the cold plate 14 extracts heat from the aerated and flavored base mix 11, and the cold plate 14 utilizes the heat energy to covert the eutectic composition 17 from sold to liquid state with little change in its temperature. Meanwhile, the extraction of heat from the aerated and flavored based mix 11 and/or the exposed freeze surface 14A freezes the aerated and flavored base mix 11. With further heat extraction, further eutectic composition 17 melting results with little change in the temperatures of the eutectic composition 17 and/or the temperatures of the exposed freeze surface 14A.

With further reference to FIGS. 6A and 6B, a resistance temperature detector (RTD) 208 monitors temperatures of the cold plate 14. The detector 208 is inserted into a tube that extends into the eutectic composition 17. As shown in FIG. 6A, an electronic display 74 displays temperatures of the cold plate 14 and is electronically coupled with a thermocouple (not shown). The display 74 also includes controller inputs for raising or decreasing the temperatures of the cold plate 14.

Figure 7:
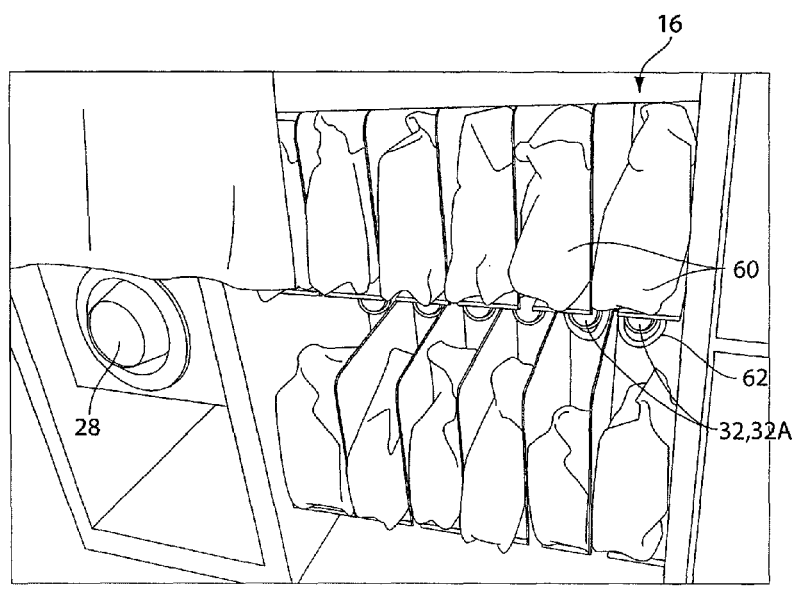
FIG. 7 shows a plurality of flavor containers and associated components of the apparatus of FIG. 1.

Referring to FIG. 7, each of the flavor containers 60 contains a distinct flavor. The names of the flavors may be indicated about a perimeter of a selector 72, e.g., a rotatable selector, or displayed in any other configuration or arrangement in association or incorporated with the selector 72. When an operator actuates, e.g., rotates, the selector 72 to identify a flavor name, e.g., selected by a customer, an electrical contact is made and one or more signals are sent to a programmable logic controller (PLC) mounted in the workstation. The programmable logic controller is programmed with software stored on a computer-readable medium that is coupled with a processor. The software matches the signal received from the selector 72 with one of the plurality of peristaltic pumps 32 that is coupled with a dedicated-flavor conduit 62, which is coupled with the flavor container 60 that contains the selected flavor. Following software instructions, the processor sends signal(s) to that pump 32 to activate the pump 32 to begin pumping the selected flavor from the container 60. When activated, the peristaltic pump 32 for the selected flavor draws the selected flavor out of the container 60 to transmit the selected flavor to the flavor block 58.

Figure 8:
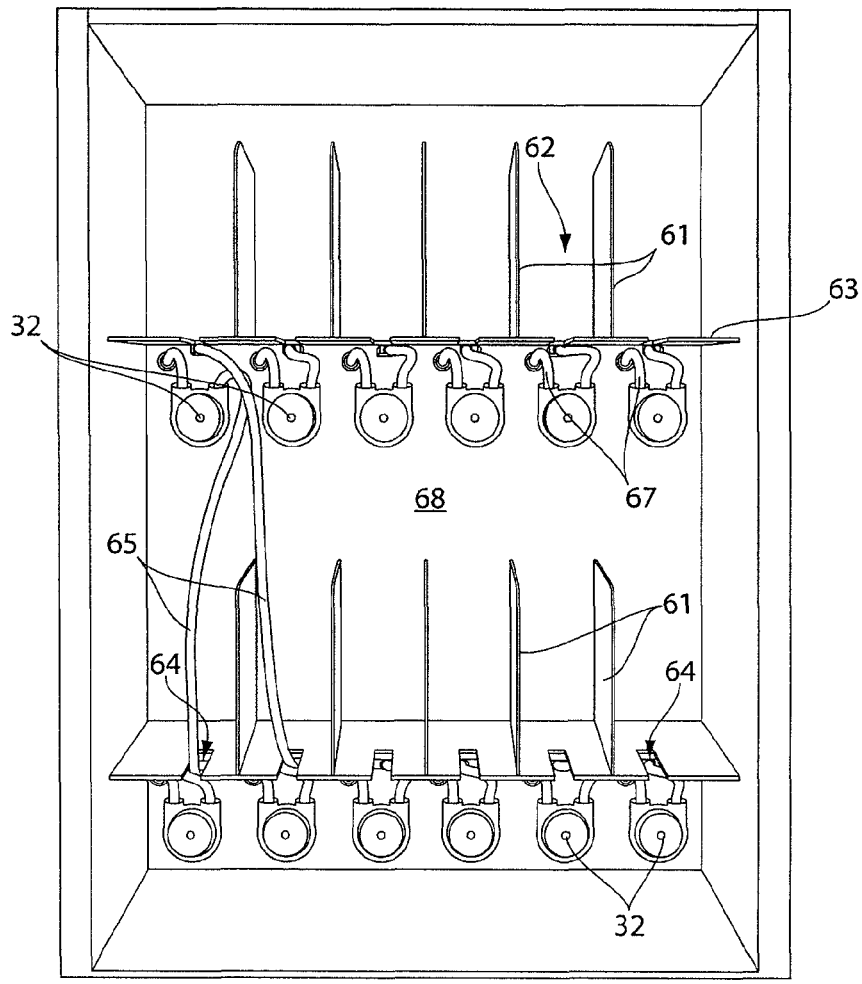
FIG. 8 shows a plurality of container bays, absent the containers, along with a plurality of conduits and a plurality of peristaltic pumps.

Referring to FIG. 8, and with further referenced to FIG. 7, the peristaltic pumps 32A for the flavor containers 60 are housed in a plurality of bays 62. As shown, each flavor container 60 is housed in a respective bay 62 defined between vertical dividers 61 on a base platform 63. As shown in FIGS. 7 and 8, in one embodiment, an upper row and a lower row of flavor container bays 62 are provided. The invention is not limited in this respect and anticipates other configurations and arrangements of the plurality of flavor containers 60 and/or the plurality of bays 62 or vertical dividers 61. The dedicated-flavor conduits 62 include an upstream segment 65 and a downstream segment 67. In one embodiment, the two segments 65 and 67 may form a continuous whole, while in another embodiment the two segments 65 and 67 may define separate components operatively connected. The portion of each dedicated-flavor conduit 62 including the upstream segment 65 is fed through one of a plurality of slots 64, as best seen defined along the lower base platform 63, when coupled with a flavor container 60 and wraps around to the side, e.g., right side, of the respective peristaltic pump 32. The portion of each dedicated-flavor conduit 62 including the downstream segment 67 extends backward from the side, e.g., left side, of the peristaltic pump 32 and feeds through a respective port 66 defined in a back wall 68 of each respective bay 62.

The pumps 32, conduits 34, and base-mix containers 30 (not visible in FIGS. 7 and 8) are mounted inside the cart 16 similarly to the way that the flavor system components are mounted (as shown in FIGS. 7 and 8), e.g., by mounting the base-mix containers 30 in separate holding bays in a refrigerated chamber behind the door 75 (shown in FIG. 6A), which provides access to enable the operator to reach in and replace emptied base-mix containers.

With further reference to FIG. 6A, the workstation 16 includes a switch 70 for selecting the base mix 11. The switch 70 may be actuated to an "ON/OFF" position or mode, as well as actuated to select a particular type of base mix. For instance, in one embodiment, the switch 70 may be actuated to three positions with a top or first position, middle or second position, and a bottom or third position. Where the switch 70 is disposed at the middle or second position, the switch 70 is positioned or activated to an "OFF" mode, wherein the peristaltic pumps 32 and 32' to base mix containers 30 and 30' are not activated and base mix is not pumped. Accordingly, when the switch 70 is in the "OFF" position, only flavor can be pumped into the turbulence tube 68 in order to "prime" the system 16 for a newly selected flavor. Where the switch 70 is disposed at the top or first position, the switch 70 is positioned or activated to select "Premium" or "premium" base mix, wherein an electrical contact is made to send electronic signal(s) to the programmable logic controller. The software in the programmable logic controller includes codes for matching the signal(s) received from the switch 70 to a peristaltic pump 32 of an appropriate base-mix container 30 that the position of the switch 70 and its signal(s) indicate. In this case, the software in the controller matches the signal(s) received from the switch 70 at the top or first position, indicating the selection of "premium" base mix. The processor in the programmable logic controller sends signal(s) to activate the respective peristaltic pump 32 to commence pumping on the conduit 34 that is coupled with the "premium" base mix container 30. Where the switch 70 is disposed at the bottom or third position, the switch 70 is positioned or activated to select an alternative base mix, such as, for instance, a "light" base mix, wherein an electrical contact is made to send electronic signal(s) to the programmable logic controller. The software in the controller matches the signal(s) received from the switch 70 at the bottom or third position, indicating the selection of "light" base mix. The processor in the programmable logic controller sends signal(s) to activate the respective peristaltic pump 32' to commence pumping on the conduit 34' that is coupled with the "light" base mix container 30'.

The software stored in the programmable logic controller further includes timed instructions to be sent to the peristaltic pumps 32, 32 and 32A' to signal the pumps 32, 32' and 32A to stop pumping after a given amount of time has elapsed that is required to deliver into the turbulence tube 68 a required or desired amount or volume of base mix 11, e.g., suitable to provide a serving size such a 5.5 ounces, and/or a required or desired amount or volume of flavor(s). In addition, the programmable logic controller further includes timed instructions to be sent to the aeration manifold 52 and/or to the respective check valves 48, 48A and 48B to stop delivery of gas after a given amount of time has elapsed that is required to deliver into the flavor block 58, the fluid junction 42, and/or the turbulence tube 68 a required or desired volume of gas suitable to achieve either light flow gas through the flavor block 58, aeration of the base mix, or purging of the flavor block 58 and the turbulence tube 68, as described herein.

The workstation 16 can further include an activation/start actuator 76 mounted along the workstation 16, e.g., near the switch 70, to provide signals to the programmable logic controller to initiate the aeration and mixing processes. In one embodiment, the activation actuator 76 when actuated, e.g., depressed or placed in a certain position, sends signal(s) to the programmable logic controller to initiate the controller and/or processor to transmit the respective signals to the respective pumps 32 or 32' and 32A to commence pumping of the base mix 11 and flavor, and also to transmit signal(s) to the air manifold 52 to commence delivery of flow of gas, e.g., light flow of gas, from the air manifold 52 through, e.g., the second gas conduit 54, to the flavor block 58 and to commence delivery of gas for aeration from the air manifold 52 through the first gas conduit 50 to the fluid junction 42.

Alternatively, other types of selectors/switches may serve as the switch 70, the flavor selector 72, and the activation/start actuator 76 to initiate the respective processes and selections each of the switch 70, the selector 72, and the actuator 76 are configured for including, but not limited to, push button switches, selectors, actuators and a touch-screen display with a graphical user interface mounted to the workstation 16 and displaying the switch 70, the flavor selector 72, and the activation/start actuator 76, as well as the options and the processes that each are configured to select and/or initiate.

Figure 9:
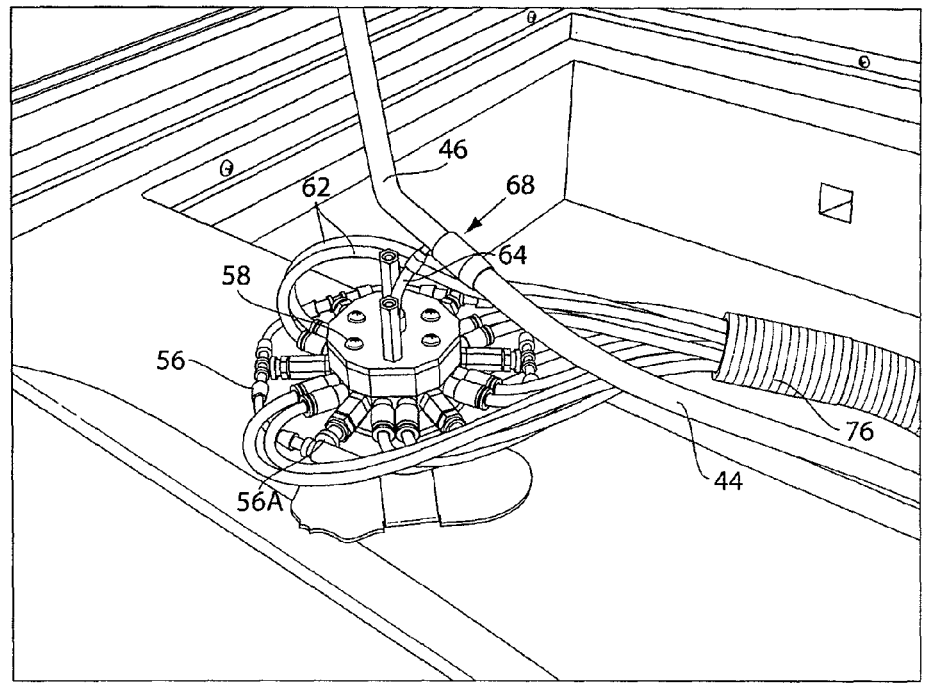
FIG. 9 shows a flavor block with coupled gas and flavor conduits.

Referring to FIG. 9, the turbulence tube 68 and the flavor block 58 are shown removed or un-mounted from the workstation 16. The third gas conduit 56 that delivers gas to the flavor block 58 for purging the flavor block 58 and other components, The second gas conduit 54 (not shown) delivers a light flow of gas and is underneath the flavor block 58 as the flavor block 58 is shown in FIG. 9. The third gas conduit 56 forms a ring around the flavor block 58 with spoke conduits 56A extending inward from the conduit 56 ring to the check valves 48. In one embodiment, gas is delivered through the third gas conduit 56 into the flavor block 58 at about 40 pounds per square inch and at about 70 standard cubic feet per minute. In one embodiment, the plurality of dedicated-flavor conduits 62 may be constructed of clear flexible tubing, e.g., food-grade tubing, and/or each conduit 62 may define an interior passage with an inner diameter of 3/32nds of an inch. The dedicated-flavor conduits 62 may be bound within a flexible sheath 76 along their length, as shown in FIG. 9, preferably between the peristaltic pumps 32 and the flavor block 58. In addition, the second gas conduit 54 may be bound within the flexible sheath 76.

Figure 10:
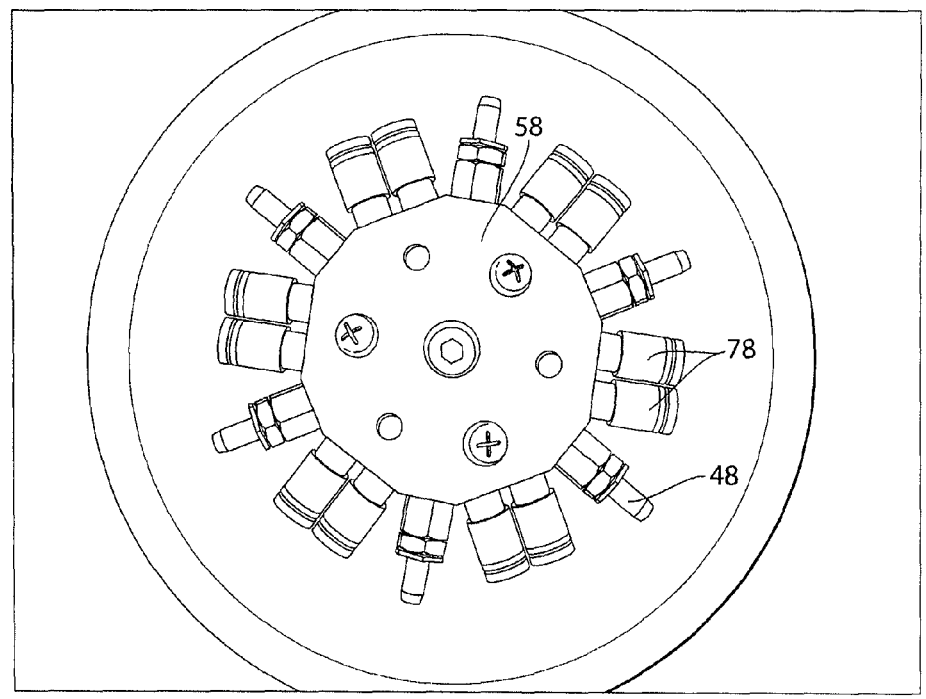
FIG. 10 shows the underside of the flavor block.

Referring to FIG. 10, the plurality of check valves 48 of the respective gas conduits and a plurality of flavor-input ports 78 are shown, as well as the flavor block 58 mounted in the bottom half of a casing 80. The casing 80 may be mounted above the cold plate 14 with the turbulence tube 86. Each of the flavor-input ports 78 contains a diaphragm (not shown) that is configured to prevent back flow of flavor or gas out of the flavor block 58.

Figure 12:
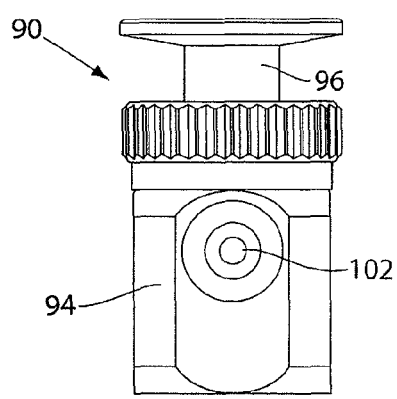
FIG. 12 shows an end view of a trumpet valve.
Figure 13:
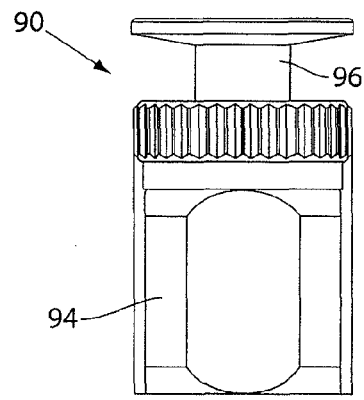
FIG. 13 shows a side view of the trumpet valve of FIG. 12.
Figure 14:
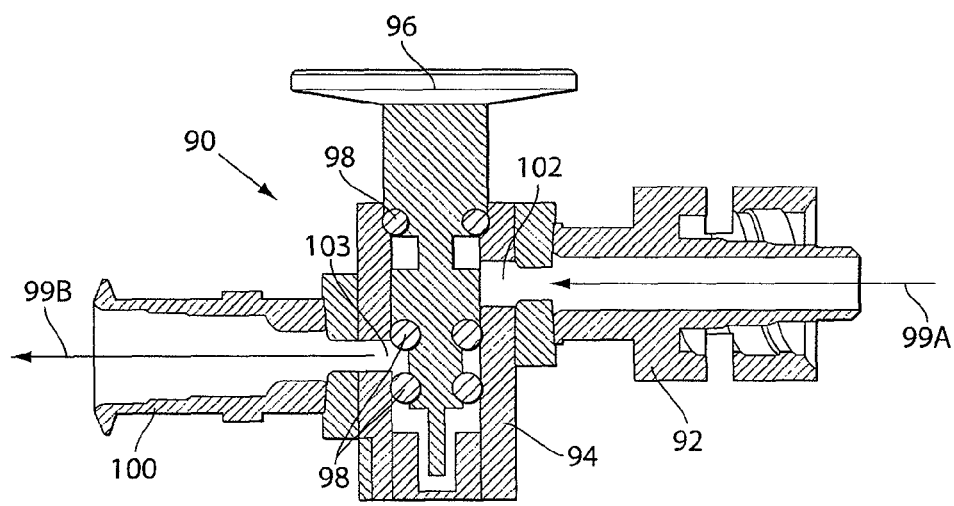
FIG. 14 shows a cut-away view of the trumpet valve of FIG. 12.

In another embodiment, the flavor block is compact and is constructed and arranged as a series of trumpet valves, e.g., a trumpet valve for each flavor, with mechanically actuated valves. Referring to FIGS. 12-14, each trumpet valve 90 is coupled with a designated-flavor conduit 62 via a connector 92, which is mounted to a port 102 in the end of the valve body 94. Accordingly, a selected flavor flows through the connector 92 and valve 90 from right to left, as shown by arrows 99A and 99B in FIG. 14, from the designated flavor conduit 62 when the plunger 96 is pressed downward to create a flow path through the interior of the valve body 94. The flavor exits the valve body 94 by flowing through a second port 103 on the opposite side of the valve body 94, as shown by arrow 99B in FIG. 14, wherein the second port 102 is coupled with a second connector 100. The second connector 100, in turn, is coupled with additional tubing leading to a fluid junction and thereafter into the turbulence tube 68. As shown in FIG. 14, where the plunger 96 is raised, a plurality of O-ring seals 98 seal an interior passage through the valve body 94 to prevent flow of flavor through the valve 90.

In this embodiment, the flavor block 58 is tightly aligned with the turbulence tube 68. The flavor block and the rigid portion 46 of the turbulence tube 68 are included in a gun-like actuator, e.g., a trumpet valve or a nozzle resembling a soda gun, whereby the actuator is configured to deliver the aerated and flavored base mix 11. The actuator can be configured as a hand-held actuator whereby an operator may hold the actuator in hand and direct the actuator to spray the aerated and flavored base mix 11 onto the cold plate 14 by moving his or her hand over the cold plate 14 and/or by altering the tilt of the actuator over the cold plate 14. Alternatively, an operator can direct the actuator toward an intermediate container 25 and spray the aerated and flavored base mix 11 into the intermediate container 25 and the base mix 11 thereafter poured from the intermediate container 25 onto the cold plate 14.

Figure 11:
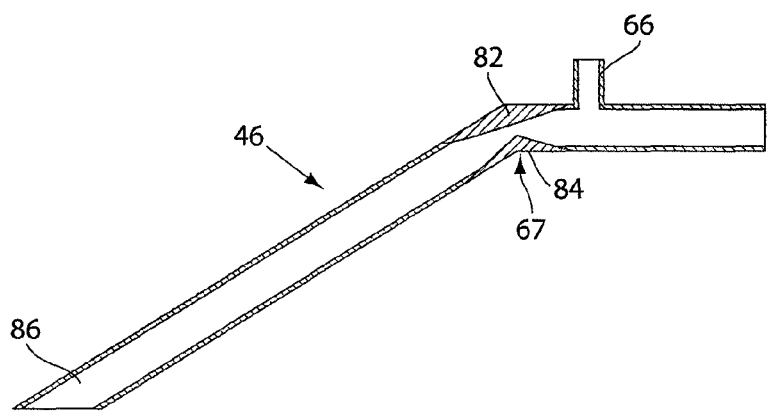
FIG. 11 provides a sectional view of a rigid portion of a turbulence tube.

Referring to FIG. 11, a cross section of an interior structure of the rigid portion 46 of the turbulence tube 68 is shown. The interior structure defines a pair of restrictive bodies 82 and 84 defined along inner walls of the rigid portion 46, or, alternatively, mounted inside the rigid portion 46. The restrictive bodies 82 and 84 may be located within the turbulence tube 68 at an optional bend 67 in the rigid portion 46, just downstream from a location where flavor is fed from the flavor block 58 through the flavor-input port 66 into the rigid portion 46 of the turbulence tube 68. The restrictive bodies 82 and 84 help to produce a constriction within the interior of the rigid portion 46 that creates a resulting Venturi effect, wherein the flow velocity of the flavor and the base mix increases through the constriction, reducing the pressure and producing a partial vacuum through the constriction via the Bernoulli effect. The partial vacuum also helps to draw the flavor through the flavor-input port 66 and into the turbulence tube 68. The restrictive bodies 82 and 84 in combination with the bend 67 in the rigid portion 46 help to thoroughly mix the flavor with the aerated base mix before the flavor and base mix are discharged from the rigid portion 46 of the turbulence tube 68 through the orifice or output 86 of the turbulence tube 68 without compromising significantly the aeration of the base mix.

In one embodiment, the interior diameter of the passage of the turbulence tube 68 is preferably about 0.375 inches before and after the restrictive bodies 82 and 84 and about 0.170 inches between the restrictive bodies 82 and 84. As shown in FIG. 11, in one embodiment, the lead-in and exit angles on the restrictive bodies may be about 30 degrees. In another embodiment, the bend 67 in the rigid portion 46 of the turbulence tube 68 is omitted, and the restrictive bodies 82 and 84 are defined in or mounted along an interior section, e.g., a straight section, of the turbulence tube 68 proximate to the flavor-input port 66 and between the flavor-input port 66 and the discharge orifice 86.

Because all the different flavors are selected and fed through the flavor block 58, through the common flavor conduit 64, and through a common flavor region in the rigid portion 46 of the turbulence tube 68, each of these components is preferably cleaned between each process of making a frozen food product, e.g., between different customer orders, via passage of pressurized gas there through, as discussed below. Accordingly, it is advantageous to keep the common flavor region of the rigid portion 46 of the turbulence tube 68 as short as is practicable in order to limit the interior surface area that requires cleaning, while enabling and maintaining adequate mixing of the flavor and base mix in the rigid portion 46 of the turbulence tube 68. In one embodiment, the common flavor region of the rigid portion is about 3 inches, while the full length of the turbulence tube 68 is about 30 inches.

Cleaning the flavor block 58, the common flavor conduit 64, and the rigid portion 46 of the turbulence tube 68 from the flavor-input port 66 through the discharge orifice 86, e.g., between each process of preparing the frozen food product, is performed by directing gas at high pressure, e.g., at about 40 PSI, from the air manifold 52 through the second gas conduit 54 into and through the flavor block 58 and then through the rigid portion 46 of the turbulence tube 68. The programmable logic controller, via software code with instructions, sends commencement signal(s) to the air manifold, e.g., when the pump 32 and 32A are shut down or off, to trigger commencement of gas flow from the air manifold 52 for purging the above-noted components. During purging, gas sweeps away most of the remaining flavor(s) from the passage walls along its path of travel, e.g., within the flavor block 58 and the common flavor conduit 64, before gas enters the turbulence tube 68. The gas-purged components are then ready for processing of another frozen food product, including a different flavor with little, if any, contamination from the flavor of the preceding product.

Many of the components described herein are likewise useful in a fully automated machine, where the fabrication of the frozen food product is performed by the machine. Such an automated machine is described in copending U.S. Ser. No. 11/140,624, filed on May 27, 2005, which is incorporated by reference herein in its entirety. For example, the peristaltic pumps 32A can be coupled with the flexible tubing 62 coupled with the flavor containers 60 in the automated machine. As another example, the flavor block 58, described herein, can be substituted for the flavor selection assembly in the apparatus described in U.S. Ser. No. 11/140,624. Additionally, the turbulence tube 68 described herein is likewise useful in the apparatus of U.S. Ser. No. 11/140,624 and can likewise be coupled to the substituted flavor block 58, e.g., and mounted in a food-preparation cover surrounding the exposed freeze surface 14A, in the workstation 16 to dispense the aerated and flavored base mix onto the freeze surface 14A. Further still, the eutectic compositions 17 described herein can likewise be contained in the food surface assembly, described in U.S. Ser. No. 11/140,624. Likewise, components described in the systems of U.S. Ser. No. 11/140,624 can be incorporated into the workstation 16 of this disclosure or substituted for corresponding components therein.

In another embodiment of the automated machine of U.S. Ser. No. 11/140,624, a second turbulence tube having a larger cross section for its inner passage is used in conjunction with the turbulence tube 68 described herein. For instance, in some embodiments, a chocolate or mocha flavor has a higher viscosity and is required at a larger volume for fabricating a frozen food product in comparison to a required volume of other flavors, such as vanilla, strawberry, banana, etc. Accordingly, a dedicated-flavor conduit 62 leading from the container 60 filled with chocolate or mocha flavor is coupled with a dedicated peristaltic pump 32A and the conduit 62 is separately routed to a flavor-input port 66 of the second turbulence tube. The machine thereby includes at least a separate turbulence tube, like that described herein, that is dedicated to a certain flavor(s), such as chocolate or mocha in order to prevent flavor mixing between processes of fabricating a frozen food product. The same base mix containers 30 and 30' are likewise coupled with both the turbulence tube 68 and the second turbulence tube dedicated to a certain flavor(s).

In describing embodiments of the invention, specific terminology is used for the sake of clarity. For purposes of description, each specific term is intended to at least include all technical and functional equivalents that operate in a similar manner to accomplish a similar purpose. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/20^{th}$, $1/10^{th}$, $1/5^{th}$, $1/3^{rd}$, $1/2$, etc., or by rounded-off approximations thereof, within the scope of the invention unless otherwise specified. Moreover, while this invention has been shown and described with references to particular embodiments thereof, those skilled in the art will understand that various substitutions and alterations in form and details may be made therein without departing from the scope of the invention; further still, other aspects, functions and advantages are also within the scope of the invention. The contents of all references, including patents and patent applications, cited throughout this application are hereby incorporated by reference in their entirety. The appropriate components and methods of those references may be selected for the invention and embodiments thereof. Still further, the components and methods identified in the Background section are integral to this disclosure and can be used in conjunction with or substituted for components and methods described elsewhere in the disclosure within the scope of the invention.

What is claimed is:

1. An apparatus for fabricating a frozen food product, the apparatus comprising:
    a cold plate including a cooling mechanism, wherein the cold plate is viewable by a customer during operation of the apparatus to fabricate the frozen food product;
    at least one base-mix container containing a base mix for the frozen food product;
    a plurality of flavor containers, each containing a flavor;
    a plurality of dedicated-flavor conduits, each dedicated-flavor conduit extending from one of the flavor containers and providing a passage for the flavor to flow from the flavor container;
    a flavor block coupled with the dedicated-flavor conduits and configured to receive flavors flowing from the dedicated-flavor conduits;
    a common flavor conduit coupled with the flavor block and configured to enable a selected flavor to flow from one of the dedicated-flavor conduits through the flavor block into the common flavor conduit; and
    a turbulence tube in fluid communication with the base-mix container for the flow of the base mix from the base-mix container through the turbulence tube, wherein the turbulence tube defines an inner passage and includes:
        a discharge end defining a discharge orifice at a second end of the inner passage; and
        a flavor-input port coupled with the common flavor conduit and defining a passage that joins the inner passage in the turbulence tube;
        wherein the turbulence tube is configured to mix flavor flowing into the turbulence tube from the flavor-input port with base mix flowing into the turbulence tube from the base-mix conduit and to discharge that mixture through the discharge orifice.

2. The apparatus of claim 1, further comprising: a source of pressurized gas;
    and a first gas conduit for aeration coupled with the pressurized-gas source and configured to enable gas to flow from the pressurized-gas source through the first gas conduit, wherein the first gas conduit is joined with the base-mix conduit, enabling gas flowing from the first gas conduit to aerate base mix flowing through the base-mix conduit.

3. The apparatus of claim 2, wherein the pressurized-gas source includes an air manifold, the apparatus further comprising a second gas conduit for a light flow of gas coupled both with the air manifold and with the flavor block, wherein the second gas conduit provides a passage for gas flow from the air manifold through the second gas conduit to the flavor block.

4. The apparatus of claim 3, wherein the flavor block defines adjoining passages to mix gas from the second gas conduit with flavor from the dedicated-flavor conduit.

5. The apparatus of claim 4, further comprising a third gas conduit for purging coupled both with the air manifold and with the flavor block, wherein the third gas conduit provides a passage for gas flow from the air manifold through the third gas conduit to the flavor block, and wherein the flavor block defines a passage to direct gas from the third gas conduit through the flavor block and out the common flavor conduit into the turbulence tube so that the gas can clean the flavor block, the common flavor conduit and the turbulence tube.

6. The apparatus of claim 5, further comprising:
a first check valve coupled with the second gas conduit so as to control a light flow of gas through the second gas conduit into the flavor block; and
a second check valve coupled with the third gas conduit so as to control flow of gas for purging through the third gas conduit into the flavor block.

7. The apparatus of claim 1, wherein a plurality of base-mix containers are included in the apparatus, wherein each base-mix container contains a base mix, wherein a respective base-mix conduit is coupled with each base-mix container, and wherein the respective base-mix conduits are coupled with the first gas conduit to enable the base mixes to be aerated by gas from the first gas conduit and to flow into the turbulence tube.

8. The apparatus of claim 7, further comprising one or more pumps configured to selectively pump the base mix from each base-mix container.

9. The apparatus of claim 8, wherein each base-mix conduit includes a flexible-walled segment, and wherein the pump is a peristaltic pump in contact with the flexible-walled segment to draw base mix from the base-mix container through the base-mix conduit.

10. The apparatus of claim 8, further comprising a base-mix selector on the apparatus, wherein the base-mix selector includes inputs for each of the base mixes.

11. The apparatus of claim 1, further comprising one or more pumps configured to selectively pump the flavor from each flavor container.

12. The apparatus of claim 1, wherein each dedicated-flavor conduit includes a flexible-walled segment, and wherein the pump is a peristaltic pump in contact with the flexible-walled segment to draw flavor from the flavor container through the dedicated-flavor conduit.

13. The apparatus of claim 12, further comprising a flavor selector on the apparatus, wherein the flavor selector includes inputs for selecting each of the flavors.

14. The apparatus of claim 13, wherein the inner passage has a cross section that substantially narrows at a restriction between the flavor-input port and the discharge orifice.

15. The apparatus of claim 14, wherein the cross section of the inner passage at the bend is about 30 to 60° of the size of the cross-section through most of the remainder of the Inner passage.

16. The apparatus of claim 1, wherein the turbulence tube and the flavor block are mounted in a gun that can be manually held, operated and displaced over the cold plate by an operator of the apparatus.

17. The apparatus of claim 1, wherein the turbulence tube is mounted in a fixed position over the cold plate.

18. The apparatus of claim 1, further comprising a plurality of containers respectively containing different solid-food mix-in additives that can be mixed into the flavored and aerated base mix on the cold plate.

19. The apparatus of claim 18, wherein the solid-food mix-in additives include additives selected from nuts, candies, fruits and portions thereof.

20. The apparatus of claim 18 wherein the solid-food-mix-in-additive containers include removable covers and are accessible to an operator of the apparatus to manually scoop the solid-food mix-in additives from the containers and deposit the scooped additive onto the cold plate.

21. The apparatus of claim 1, wherein the cooling mechanism of the cold plate includes a eutectic composition that melts at a temperature of about 0° F. or less.

22. The apparatus of claim 1, wherein the cooling mechanism of the cold plate includes a passage containing a chlorofluorocarbon fluid.

23. The apparatus of claim 1, wherein the apparatus occupies a footprint of no more than about 30 square feet when positioned on a floor space with the cold plate facing up.

24. The apparatus of claim 1, wherein the cold plate is unenclosed, and wherein the apparatus is configured for fabrication of the frozen food product without enclosing the cold plate.

25. An apparatus for fabricating a frozen food product, the apparatus comprising:
a cold plate including a cooling mechanism, wherein the cold plate is viewable by a customer during operation of the apparatus to fabricate the frozen food product;
at least one base-mix container containing a base mix for the frozen food product;
a plurality of liquid-ingredient containers, each containing a liquid and at least one containing a flavor;
a plurality of dedicated-liquid conduits, each dedicated-liquid conduit extending from one of the liquid-ingredient containers and providing a passage for the liquid to flow from the liquid-ingredient container;
a flavor block coupled with the dedicated-liquid conduits and configured to receive liquids flowing from the dedicated-liquid conduits;
a common liquid conduit coupled with the flavor block and configured to enable a selected liquid to flow from one of the dedicated-liquid conduits through the flavor block into the common liquid conduit; and
a turbulence tube in fluid communication with the base-mix container for the flow of the base mix from the base-mix container through the turbulence tube, wherein the turbulence tube defines an inner passage and includes:
a discharge end defining a discharge orifice at a second end of the inner passage; and
a liquid-input port coupled with the common flavor conduit and defining a passage that joins the inner passage in the turbulence tube;
wherein the turbulence tube is configured to mix flavor flowing into the turbulence tube from the liquid-input port with base mix flowing into the turbulence tube from the base-mix conduit and to discharge that mixture through the discharge orifice.

* * * * *